(12) United States Patent
Yu et al.

(10) Patent No.: US 12,429,549 B2
(45) Date of Patent: Sep. 30, 2025

(54) COOPERATIVE POSITIONING METHOD AND APPARATUS

(71) Applicant: KOREA RAILROAD RESEARCH INSTITUTE, Gyeonggi-do (KR)

(72) Inventors: Seung Min Yu, Hwaseong-si (KR); Jun Lee, Gyeonggi-do (KR); So Young You, Chungcheongnam-do (KR); Sang Pil Ko, Gyeonggi-do (KR); Eun Bi Jeong, Gyeonggi-do (KR)

(73) Assignee: KOREA RAILROAD RESEARCH INSTITUTE, Uiwang-si (KR)

( * ) Notice: Subject to any disclaimer, the term of this patent is extended or adjusted under 35 U.S.C. 154(b) by 345 days.

(21) Appl. No.: 18/157,304

(22) Filed: Jan. 20, 2023

(65) Prior Publication Data

US 2023/0152415 A1 May 18, 2023

Related U.S. Application Data

(63) Continuation of application No. PCT/KR2021/006843, filed on Jun. 2, 2021.

(30) Foreign Application Priority Data

Jul. 22, 2020 (KR) ........................ 10-2020-0091202

(51) Int. Cl.
*G01S 5/02* (2010.01)
*G01S 5/00* (2006.01)

(52) U.S. Cl.
CPC .......... *G01S 5/0244* (2020.05); *G01S 5/0072* (2013.01); *G01S 5/0289* (2013.01); *G01S 2201/02* (2019.08)

(58) Field of Classification Search
CPC ..... G01S 5/0244; G01S 5/0072; G01S 5/0289
(Continued)

(56) References Cited

U.S. PATENT DOCUMENTS 9,749,799 B2 8/2017 Cho et al.
10,097,956 B2 10/2018 Cho et al.
(Continued)

FOREIGN PATENT DOCUMENTS

CN 103905992 A * 7/2014
CN 104144437 A * 11/2014
(Continued)

OTHER PUBLICATIONS

Korean Office Action for Application No. 10-2020-0091202 dated Feb. 8, 2021.
(Continued)

*Primary Examiner* — Harry K Liu
(74) *Attorney, Agent, or Firm* — Sughrue Mion, PLLC

(57) ABSTRACT

A method and apparatus for cooperative positioning is disclosed herein. A method for cooperative positioning performed by a target device includes: scanning a beacon signal transmitted by at least one peripheral device; determining whether at least one peripheral device exist within a reference radius based on the beacon signal; when the at least one peripheral device is within the reference radius, transmitting a cooperative positioning request to the at least one peripheral device; receiving, in response to transmitting the cooperative positioning request, location of the at least one peripheral device and a degree of reliability for the location of the at least one peripheral device; and determining a location of the target device based on the location and the degree of reliability.

20 Claims, 7 Drawing Sheets

(58) Field of Classification Search
USPC .......................................................... 342/463
See application file for complete search history.

(56) References Cited

U.S. PATENT DOCUMENTS

| | | | |
|---|---|---|---|
| 2012/0172055 A1* | 7/2012 | Edge | G01S 5/0249 |
| | | | 455/456.1 |
| 2016/0212587 A1 | 7/2016 | Cho et al. | |
| 2017/0325066 A1 | 11/2017 | Cho et al. | |
| 2020/0120447 A1* | 4/2020 | Rydén | H04W 4/029 |
| 2021/0409896 A1* | 12/2021 | Ahn | H04W 88/06 |
| 2023/0314553 A1* | 10/2023 | Diamond | G01S 5/14 |
| | | | 342/463 |

FOREIGN PATENT DOCUMENTS

| | | | |
|---|---|---|---|
| CN | 105557032 B * | 6/2019 | |
| CN | 110234072 A * | 9/2019 | |
| JP | 2006119550 A * | 5/2006 | |
| KR | 10-2014-0098283 A | 8/2014 | |
| KR | 10-2016-0090231 A | 7/2016 | |
| KR | 10-2019-0001386 A | 1/2019 | |
| KR | 10-2019-0012984 A | 2/2019 | |
| KR | 10-2019-0066370 A | 6/2019 | |
| WO | WO-2021098028 A1 * | 5/2021 | |
| WO | WO-2021186566 A1 * | 9/2021 | |

OTHER PUBLICATIONS

International Search Report for PCT/KR2021/006843 dated Sep. 14, 2021.

* cited by examiner

COOPERATIVE POSITIONING METHOD AND APPARATUS

CROSS REFERENCE TO RELATED APPLICATION

This application is a continuation of PCT Patent Application PCT/KR2021/006843 filed Jun. 2, 2021, and claims priority to Patent Application No. 10-2020-0091202, filed on Jul. 22, 2020 in Korea, the entire contents of which are incorporated herein by reference.

BACKGROUND a. Technical Field

The present disclosure relates to a method and an apparatus for cooperative positioning, and more particularly, to a method and an apparatus for cooperative positioning in which a low-performance device that does not support a high-performance positioning technology can indirectly perform a high-performance positioning technology through a high-performance device.

b. Background Art

The contents described in the present section simply provide background information on the present disclosure and do not constitute related art.

Network-based positioning technology is being used more widely to provide the location of a device in GPS signal shaded areas, such as indoors and underground. In general, a positioning method based on a wireless LAN estimates a location of a device using fingerprint method or multilateration based on received signal strength (RSSI) or timing data (e.g. RTT, ToA, TDoA, ToF, etc.) of beacon signals.

A representative method of indoor positioning methods using wireless signals is a method of estimating a location of a device by obtaining a distance between a device and each of the access points (AP) using signals received by the device from the access points and applying multilateration including triangulation to the AP-device distance.

In general, communication standards used in network-based positioning technology include Bluetooth, Bluetooth at Low Energy (BLE), geo-magnetic intensity, Wi-Fi, and the like. Here, the WiFi-based positioning technology uses a Received Signal Strength Indicator (RSSI).

Recently, research on network-based positioning technology has been actively conducted, and a positioning method based on Wi-Fi Round Trip Time (RTT), a positioning method based on UWB, and the like are being developed. Such positioning methods can accurately estimate the location of a device, but the device needs to be equipped with a high-performance chipset or needs to be able to implement an algorithm. That is, in the case of low-cost or low-performance devices, it is difficult to enjoy the benefits of high-performance positioning technology since they cannot support high-performance positioning technology.

Meanwhile, since network-based positioning technologies use radio signals, a device cannot use the positioning technology in an area where no radio signal reaches. In addition, due to the nature of the radio signal, when the signal strength changes according to various factors such as time, weather, or floating population, or when the radio signal is distorted by multipath, non-line of sight (NLOS) or the like, there may be areas where the accuracy of positioning is low in an indoor environment. Specifically, since an indoor space is mostly an NLOS environment with no straight path between devices, there is a high possibility that the distance measurement value and the final position estimation value contain errors.

Accordingly, research on a positioning method that can estimate a location of the device using a peripheral device for when a device is a low-cost or low-performance device or is located in an area where it is difficult for the device to receive radio signals is needed.

In this case, when the estimated location of the peripheral device is estimated as the location of the target device, a positioning error may occur due to a distance between the target device and the peripheral device. Accordingly, additional research on positioning technology that can reduce the error due to the distance between devices is also needed.

SUMMARY

An aspect of the present disclosure is directed to providing a method for cooperative positioning performed by a target device including: scanning beacon signal transmitted by at least one peripheral device; determining whether at least one peripheral device exist within a reference radius based on the beacon signal; when the at least one peripheral device is within the reference radius, transmitting a cooperative positioning request to the at least one peripheral device; receiving, in response to transmitting the cooperative positioning request, location of the at least one peripheral device and a degree of reliability for the location of the at least one peripheral device; and determining a location of the target device based on the location and the degree of reliability.

Another aspect of the present disclosure is directed to providing a target device using a method for cooperative positioning, the device comprising: a scanning unit configured to scan beacon signal transmitted by at least one peripheral device; a determining unit configured to determine whether at least one peripheral device exist within a reference radius based on the beacon signal; a requesting unit configured to, when the at least one peripheral device is within the reference radius, transmit a cooperative positioning request to the at least one peripheral device; a receiving unit configured to receive, in response to transmitting the cooperative positioning request, location of the at least one peripheral device and a degree of reliability for the location of the at least one peripheral device; and a deciding unit configured to determine a location of the target device based on the location and the degree of reliability.

DETAILED DESCRIPTION

Figure 1:
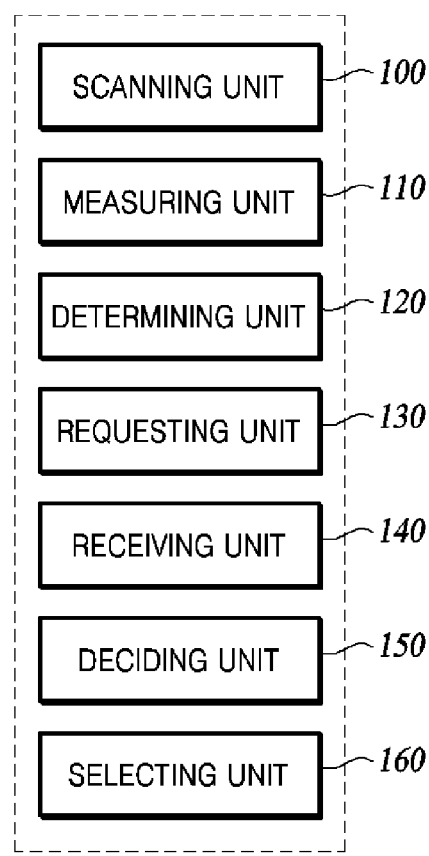
FIG. 1 is a configuration diagram of a target device according to one embodiment of the present disclosure.

Embodiments of the present disclosure provide a method and an apparatus for cooperative positioning for improving positioning accuracy by allowing a low-performance device that does not support the high-performance positioning technology to indirectly use the high-performance positioning technology of a high-performance device.

Other embodiments of the present disclosure provide a method and an apparatus for cooperative positioning for expanding an area where positioning is feasible by using a positioning technology of a peripheral device when a target device is located in an area where positioning is unfeasible or is difficult.

Other embodiments of the present disclosure provide a method and an apparatus for cooperative positioning that can reduce error due to a distance between a low-performance device and a high-performance device by performing a method of determining the location of the low-performance device from the locations of the high-performance devices in two ways depending on the distances between the high-performance devices.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a configuration diagram of a target device according to one embodiment of the present disclosure.

Referring to FIG. 1, a target device 10 according to one embodiment of the present disclosure includes a scanning unit 100, a measuring unit 110, a determining unit 120, a requesting unit 130, a receiving unit 140, and a deciding unit 150. The target device 10 according to one embodiment of the present disclosure may further include a selecting unit 160.

The scanning unit 100 scans beacon signals transmitted by a plurality of peripheral devices. Here, the beacon signal includes identification information of the plurality of peripheral devices. The identification information includes one or more of a MAC address, a Service Set Identifier (SSID), or identification information.

The measuring unit 110 measures a distance to at least one peripheral device based on the beacon signals. Here, the distance to at least one peripheral device means distances between the target device 10 and each of the peripheral devices.

To measure the distance between the target device 10 and each peripheral device, the measuring unit 110 measures at least one of received signal strength indicator (RSSI), round trip time (RTT), time of flight (ToF), time of arrival (ToA), or time difference of arrival (TDoA) of the beacon signals. The measuring unit 110 may measure the distance between the target device 10 and each peripheral device based on at least one of RSSI, RTT, ToF, ToA, or TDoA of the beacon signal.

The determining unit 120 is a component that determines whether at least one peripheral devices exist within a reference radius. Furthermore, the determining unit 120 may determine whether there exist at least three peripheral devices having similar distances from the target device outside the reference radius. Here, the reference radius is a distance from the target device 10 and refers to a preset radius.

The determining unit 120 identifies a device group including at least three peripheral devices outside the reference radius when the at least one peripheral device is outside the reference radius. Additionally, the determining unit 120 determines whether a differences between distances from two different peripheral devices in the device group to the target device is smaller than a preset distance. This is to determine whether at least three peripheral devices are located at similar distances from the target device.

Even though at least one peripheral device exist within the reference radius, when the degree of reliability for the location of the at least one peripheral device are lower than a preset value, the determining unit 120 determines whether a device group including at least three peripheral devices exists outside the reference radius. Additionally, the determining unit 120 determines whether a difference between distances from two different peripheral devices included in the device group to the target device is smaller than the preset distance.

Meanwhile, the determining unit 120 may identify a second device group including at least three second peripheral devices outside the reference radius. When a second device group exists, the determining unit 120 determines whether a difference between distances from two different second peripheral devices included in the second device group to the target device is smaller than the preset distance.

The requesting unit 130 is a component that, when there exist one or more peripheral devices within the reference radius, transmits a cooperative positioning request to one or more peripheral devices.

In addition, when the determining unit 120 determines that there exists a device group outside the reference radius and determines that a difference between distances from two different peripheral devices included in the device group to the target device is smaller than the preset distance, the requesting unit 130 transmits cooperative positioning requests to at least three peripheral devices included in the device group.

Moreover, when there exist the device group and the second device group, the requesting unit 130 transmits a cooperative positioning request to peripheral devices included in the device group selected by the selecting unit 160.

The receiving unit 140 is a component that receives the location of at least one peripheral device and a degree of reliability for the location from the at least one peripheral device in response to transmitting the cooperative positioning request. The degree of reliability is explained in detail in FIG. 4.

Additionally, the receiving unit 140 may receive at least three locations of at least three peripheral devices included in the device group from the at least three peripheral devices.

Additionally, when there exist the device group and the second device group, the receiving unit 140 may receive at least three locations of the at least three peripheral devices included in the device group selected by the selecting unit 160 from the at least three peripheral devices.

The receiving unit 140 according to one embodiment of the present disclosure may receive locations of peripheral devices from either a peripheral device or an external server. Here, the location is estimated by the external server or the peripheral device through a plurality of APs. In other words, the location of the peripheral device may be estimated by each device through the plurality of APs or by the external server. In this case, the external server estimates the location of the peripheral device after collecting AP beacon signals received by the peripheral device from the plurality of APs.

The deciding unit 150 is a component that determines, the location of a target device using the location of at least one peripheral device based on the degree of reliability when there exist at least one peripheral device within the reference radius. Here, the degree of reliability means the accuracy of the location estimated by the peripheral device through the AP. Specifically, the degree of reliability is a value determined based on a differences between a first distances between locations of a plurality of APs and the location of the at least one peripheral device, and a second distances derived by the at least one peripheral device using signals received from the plurality of APs. The degree of reliability is calculated to be higher as the difference between the first distance and the second distance is smaller.

In this case, according to one embodiment of the present disclosure, when the degree of reliability of the location of at least one peripheral device is greater than the preset value, the deciding unit 150 may determine the location of the at least one peripheral device as the location of the target device.

According to another embodiment of the present disclosure, when there exists a plurality of peripheral devices within the reference radius, the deciding unit 150 may determine a weighted average of locations of the plurality of peripheral devices as the location of the target device using the degree of reliability for the locations of the plurality of peripheral devices as weights. In other words, the deciding unit 150 may determine, as the location of the target device, the calculated weighted average value obtained by reflecting weights proportional to the degrees of reliability of the plurality of peripheral devices to the locations.

According to one embodiment of the present disclosure, when there exists a plurality of peripheral devices within the reference radius, the deciding unit 150 may identify locations having a degree of reliability higher than a preset value from the locations of the plurality of peripheral devices, and determine a weighted average of the identified locations as the location of the target device using degrees of reliability for the identified locations as weights.

According to one embodiment of the present disclosure, when there exist at least three peripheral devices outside the reference radius, the deciding unit 150 determines circumcenter coordinates of a triangle created using the at least three locations as the location of the target device.

When four or more peripheral devices are included in the device group outside the reference radius, the deciding unit 150 may generate a plurality of triangles using the locations of the four or more peripheral devices. Thereafter, the deciding unit 150 may derive circumcenter coordinates of the plurality of triangles, and determine one of a mean position or a median position of the circumcenter coordinates as the location of the target device. Here, the mean position of the circumcenter coordinates refers to coordinates having a dimensional average value of the circumcenter coordinates. The median position of the circumcenter coordinates refers to coordinates having a dimensional median value of the circumcenter coordinates.

When there exist the device group and the second device group, the selecting unit 160 is a component that selects a device group having a shorter distance from the target device among the device group and the second device group. Here, each device group needs to satisfy the condition that a difference between distances from two different peripheral devices included in each device group to the target device is less than the preset distance. The receiving unit 140 receives at least three locations of the at least three peripheral devices included in the device group selected by the selecting unit 160 from the at least three peripheral devices. The deciding unit 150 determines, as the location of the target device, the circumcenter coordinates of the triangle generated from the locations of the peripheral devices included in the selected device group.

Figure 2A:
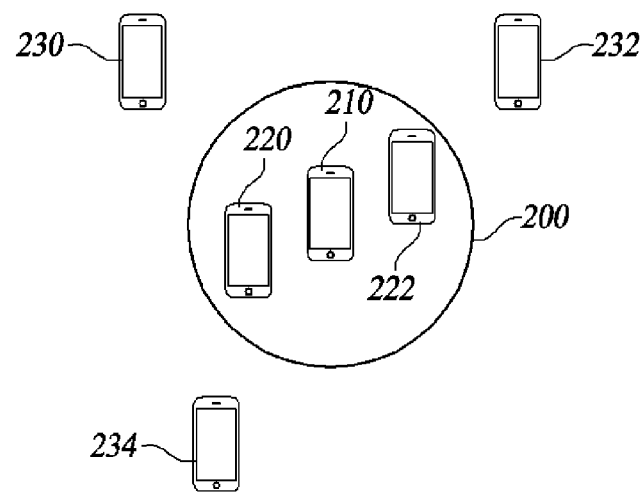
FIG. 2A is a diagram illustrating a process of determining a location of a target device through one or more peripheral devices within a reference radius according to one embodiment of the present disclosure.

FIG. 2A is a diagram illustrating a process of determining a location of a target device through one or more peripheral devices within a reference radius according to one embodiment of the present disclosure.

Referring to FIG. 2A, a reference radius 200, a target device 210, and a plurality of peripheral devices 220, 222, 230, 232, and 234 are shown. The plurality of peripheral devices 220, 222, 230, 232, and 234 include two peripheral devices 220 and 222, and three peripheral devices 230, 232 and 234. The two peripheral devices 220 and 222 include a first peripheral device 220 and a second peripheral device 222. The three peripheral devices 230, 232, and 234 include a third peripheral device 230, a fourth peripheral device 232, and a fifth peripheral device 234.

The target device 210 scans beacon signals transmitted from the plurality of peripheral devices 220, 222, 230, 232, and 234. The target device 210 measures distances to the plurality of peripheral devices 220, 222, 230, 232, and 234 based on the beacon signals.

The target device 210 determines whether there exist one or more peripheral devices within the reference radius 200. In FIG. 2A, two peripheral devices 220 and 222 exist within the reference radius 200.

The target device 210 transmits a cooperative positioning request to the two peripheral devices 220 and 222 within the reference radius. Then, the target device 210 receives locations and degrees of reliability of the two peripheral devices 220 and 222 from the two peripheral devices 220 and 222.

The target device 210 may determine one of the two locations of the two peripheral devices 220 and 222 as its location based on the degrees of reliability.

When both the degrees of reliability of the two locations are greater than a preset value, the target device 210 may arbitrarily select one of the two locations and determine it as its own location.

When both the degrees of reliability of the two locations are greater than the preset value, a location obtained by calculating, using the degrees of reliability, a weighted average of the locations of the two peripheral devices 220 and 222 may be determined as the location of the target device 210. For example, when the degree of reliability of the location of the first peripheral device 220 is higher than the degree of reliability of the location of the second peripheral device 222, the target device 210 may assign a higher weight to the location of the first peripheral device 220. Conversely, the target device 300 may assign a lower weight to the location of the second peripheral device 222.

Meanwhile, in case that there exist three or more peripheral devices within the reference radius 200, when the degree of reliability of the location of one peripheral device is less than the preset value and the degrees of reliability of the locations of the other peripheral devices are greater than the preset value, a location obtained by calculating, using the degrees of reliability, a weighted average of the locations of the other peripheral devices may be determined as the location of the target device 210. That is, after excluding the location having the degree of reliability lower than the preset value, the location of the target device 210 is determined from the other peripheral devices.

When the degree of reliability of the location of the second peripheral device 222 among the two locations is less than the preset value, the target device 210 may determine the location of the first peripheral device 220 as its own location.

When both the degrees of reliability of the two locations are less than the preset value, the target device 210 may determine whether there exists a device group including at least three devices outside the reference radius. This is explained in detail with reference to FIG. 2B, FIG. 2C and FIG. 3.

Figure 2B:
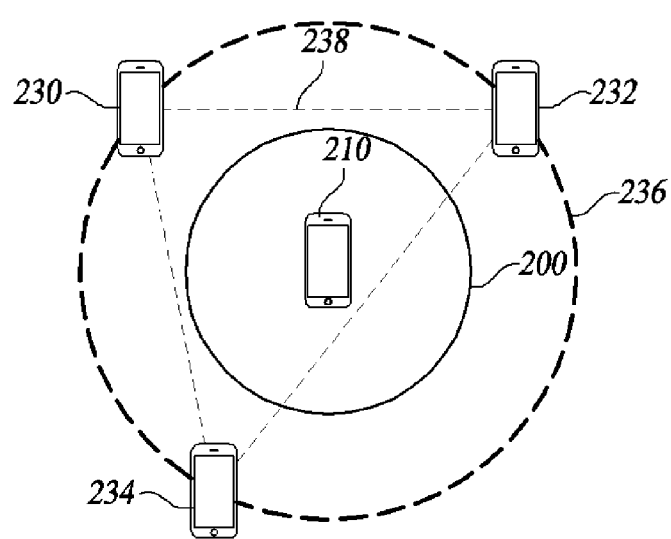
FIG. 2B is a diagram illustrating a process of determining a location of a target device through at least three peripheral devices outside a reference radius according to one embodiment of the present disclosure.

FIG. 2B is a diagram illustrating a process of determining a location of a target device through at least three peripheral devices outside a reference radius according to one embodiment of the present disclosure.

Referring to FIG. 2B, a reference radius 200, a target device 210, three peripheral devices 230, 232, 234, a device group radius 236, and a triangle 238 are shown. The three peripheral devices 230, 232, and 234 include a third peripheral device 230, a fourth peripheral device 232 and a fifth peripheral device 234. The device group radius 236 may be expressed as a single circle, but may also be expressed as a ring shape having a small radius and a large radius. This means that the distances from the target device 210 to each of the peripheral devices may be different from each other.

When there is no peripheral device within the reference radius 200 or that there is no peripheral device whose degree of reliability for the location is greater than the preset value, the target device 210, based on the scanned beacon signal, determines whether there exists a device group including at least three peripheral devices outside the reference radius 200. In FIG. 2B, three peripheral devices 230, 232, and 234 constitute one device group.

The target device 210 determines whether a difference between distances from two different peripheral devices included in the device group to the target device 210 is smaller than a preset distance. In other words, the difference between the distances from two different peripheral devices included in the device group to the target device 210 should be less than the preset distance. This is a process for checking whether the three peripheral devices 230, 232, and 234 included in the device group have similar distances from the target device 210. This is because the circumcenter coordinates of the triangle 238 can be estimated as the location of the target device 210 only when the three peripheral devices 230, 232, and 234 are located at similar distances from the target device 210.

For example, the target device 210 calculates a first distance between the third peripheral device 230 and the target device 210, and calculates a second distance between the fourth peripheral device 232 and the target device 210. The target device 210 determines whether a difference between the first distance and the second distance is smaller than the preset distance. In addition, the target device 210 performs the same process for the pair of the fourth peripheral device 232 and the fifth peripheral device 234, and performs the same process for the pair of the third peripheral device 230 and the fifth peripheral device 234. When the difference between the distances from two different peripheral devices to the target device 210 is smaller than the preset distance, the target device 210 recognizes that the three peripheral devices 230, 232, and 234 are located at similar distances from the target device 210.

When the three peripheral devices 230, 232, and 234 have similar distances from the target device 210, the target device 210 transmits a cooperative positioning request to the three peripheral devices 230, 232, and 234. The target device 210 receives the locations of the three peripheral devices 230, 232, and 234 from the three peripheral devices 230, 232, and 234.

The target device 210 creates the triangle 238 using the locations of the three peripheral devices 230, 232, and 234 and then determines the circumcenter coordinates of the triangle 238 as its own location.

Figure 2C:
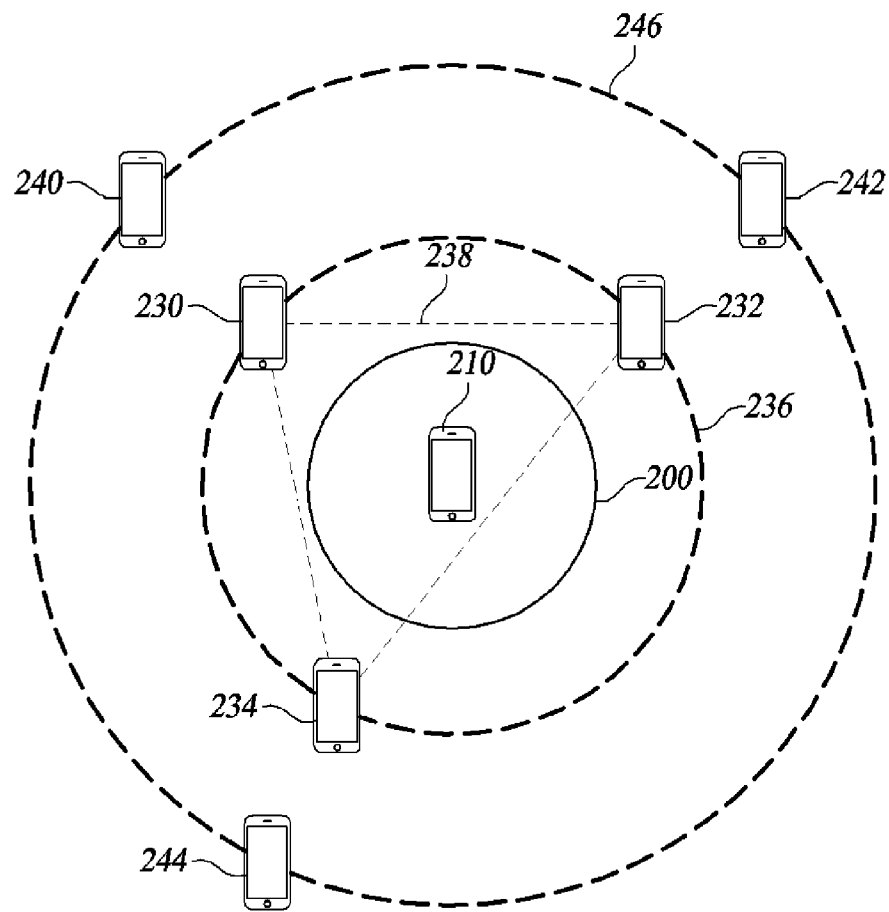
FIG. 2C is a diagram illustrating a process of determining a location of a target device through two device groups outside a reference radius according to one embodiment of the present disclosure.

FIG. 2C is a diagram illustrating a process of determining a location of a target device through two device groups outside a reference radius according to one embodiment of the present disclosure.

Referring to FIG. 2C, a reference radius 200, a target device 210, three first peripheral devices 230, 232, and 234, a first device group radius 236, a triangle 238, and three second peripheral devices 240, 242, 244 and a second device group radius 246 are shown. The three first peripheral devices 230, 232, and 234 include a third peripheral device 230, a fourth peripheral device 232, and a fifth peripheral device 234. The three second peripheral devices 240, 242 and 244 include a sixth peripheral device 240, a seventh peripheral device 242, and an eighth peripheral device 244.

The target device 210 determines whether there exist a first device group and a second device group, each including at least three peripheral devices. In this case, the peripheral devices included in the first device group and the second device group should not be completely identical.

The target device 210 further determines whether a difference between distances from two different peripheral devices included in each device group to the target device 210 is smaller than a preset distance. That is, it is determined whether the three first peripheral devices 230, 232, and 234 have similar distances from the target device 210. Additionally, the target device 210 determines whether the distances of the three second peripheral devices 240, 242, and 244 from the target device 210 are similar. The detailed process is the same as the process described with reference to FIG. 2B.

When the three first peripheral devices 230, 232, and 234 are located within the first device group radius 236 and the three second peripheral devices 240, 242, and 244 are located within the second device group radius 246, the target device 210 selects a device group closer to the target device 210. In FIG. 2C, since the first device group radius 236 is closer to the target device 210 than the second device group radius 246, the target device 210 selects the first device group located within the first device group radius 236. The target device 210 transmits a cooperative positioning request to the three first peripheral devices 230, 232, and 234 included in the selected group and receives locations of three first peripheral devices 230 from three first peripheral devices 230, 232, 234.

The target device 210 creates the triangle 238 using the locations of the three peripheral devices 230, 232, and 234 included in the selected first device group, and determines the coordinates of the circumcenter of the triangle 238 as the location of the target device 210.

Figure 3:
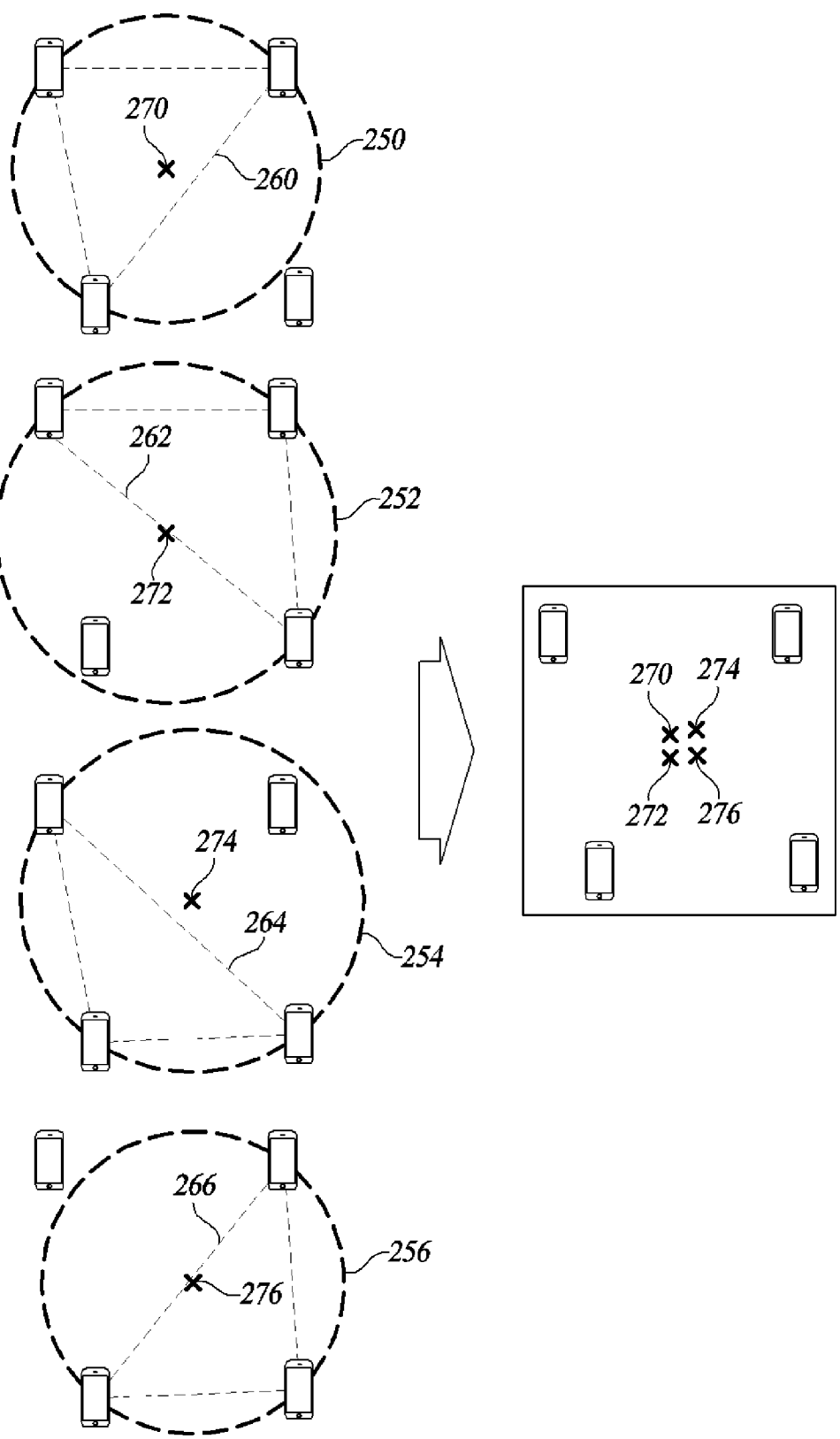
FIG. 3 is a diagram illustrating a process of determining a location of a target device through at least four peripheral devices outside a reference radius according to one embodiment of the present disclosure.

FIG. 3 is a diagram illustrating a process of determining a location of a target device through at least four peripheral devices outside a reference radius according to one embodiment of the present disclosure.

Referring to FIG. 3, a plurality of device group radii 250, 252, 254, 256, a plurality of triangles 260, 262, 264, 266, and a plurality of circumcenter coordinates 270, 272, 274, 276 are shown. The plurality of device group radii 250, 252, 254, and 256 include a first device group radius 250, a second device group radius 252, a third device group radius 254, and a fourth device group radius 256. The plurality of triangles 260, 262, 264, and 266 include a first triangle 260, a second triangle 262, a third triangle 264, and a fourth triangle 266. The plurality of circumcenter coordinates 270, 272, 274, and 276 include a first circumcenter coordinate 270, a second circumcenter coordinate 272, a third circumcenter coordinate 274, and a fourth circumcenter coordinate 276.

When there are four or more peripheral devices having similar distances from the target device, a plurality of device group radii 250, 252, 254, and 256 may be generated from a combination of at least three peripheral devices among the four or more peripheral devices. Here, a difference between distances from two different peripheral devices among the peripheral devices located in each of the plurality of device group radii 250, 252, 254, and 256 to the target device is smaller than a preset distance.

The target device may create one triangle from three peripheral devices included in each device group. In FIG. 3, the target device may create four triangles using four peripheral devices located at similar distances from the target device.

The target device may derive the plurality of circumcenter coordinates 270, 272, 274, and 276 for the plurality of triangles 260, 262, 264, and 266. The target device may determine any one of a mean position or a median position of the plurality of circumcenter coordinates 270, 272, 274, and 276 as the location of the target device.

Figure 4:
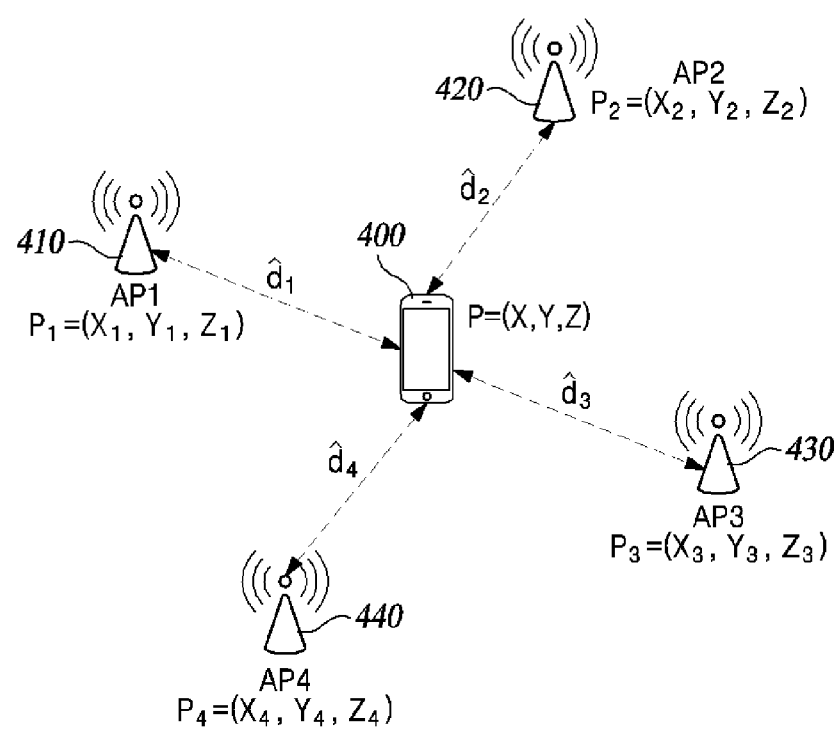
FIG. 4 is a diagram illustrating a process of evaluating a degree of reliability of an estimated location of a peripheral device according to one embodiment of the present disclosure.

FIG. 4 is a diagram illustrating a process of evaluating a degree of reliability of an location of a peripheral device according to one embodiment of the present disclosure.

Referring to FIG. 4, a peripheral device 400 and a plurality of APs 410, 420, 430, and 440 are illustrated. Hereinafter, it will be described that the peripheral device 400 performs the degree of reliability calculation process, but this is only one exemplary embodiment, and after an external server receives data from the peripheral device 400 and performs the degree of reliability calculation process, the degree of reliability information may be transmitted to the target device from the external server.

The peripheral device 400 according to one embodiment of the present disclosure calculates a first distance between the peripheral device 400 and each of the plurality of APs 410, 420, 430, and 440 based on the location of the peripheral device 400 and the pre-stored location coordinates of the plurality of APs 410, 420, 430, and 440. In addition, the peripheral device 400 calculates a second distance from the target beacon signals. The peripheral device 400 calculates the degree of reliability of the estimated location based on the difference between the first distance and the second distance. Here, the peripheral device 400 evaluates the degree of reliability higher as the difference between the first distance and the second distance decreases. For example, the peripheral device 400 obtains a first distance and a second distance to a first AP 410. The peripheral device 400 calculates a first error that is a difference between the first distance and the second distance. The peripheral device 400 calculates an error between the first distance and the second distance with respect to the plurality of APs 410, 420, 430, and 440, and peripheral device 400 evaluates the degree of reliability of its location higher as the total error is smaller.

According to one embodiment of the present disclosure, the peripheral device 400 may calculate the degree of reliability using the following equations that are expressed as Eq. 1 to Eq. 3, but the present disclosure is not limited thereto, and may include all equations that evaluate a degree of reliability higher as the error between the first distance and the second distance is smaller.

$$\frac{1}{\text{Reliability}} = \frac{1}{N}\Sigma_i^N \left| \hat{d}_i - \|P - P_i\| \right| \quad \text{(Eq. 1)}$$

$$\frac{1}{\text{Reliability}} = \frac{1}{N}\Sigma_i^N \left( \hat{d}_i - \|P - P_i\| \right)^2 \quad \text{(Eq. 2)}$$

$$\frac{1}{\text{Reliability}} = \sqrt{\frac{1}{N}\Sigma_i^N \left( \hat{d}_i - \|P - P_i\| \right)^2} \quad \text{(Eq. 3)}$$

In Eq. 1 to Eq. 3, N means the number of APs, i means the index of the plurality of APs, P means the location of the peripheral device 400, $P_i$ means the location coordinates of the plurality of APs 410, 420, 430, and 440, $\hat{d}_i$ means the second distance between the plurality of APs 410, 420, 430, and 440 and the peripheral device 400, and $\|P-P_i\|$ means the first distance between the peripheral device 400 and the plurality of APs 410, 420, 430, and 440.

Figure 5:
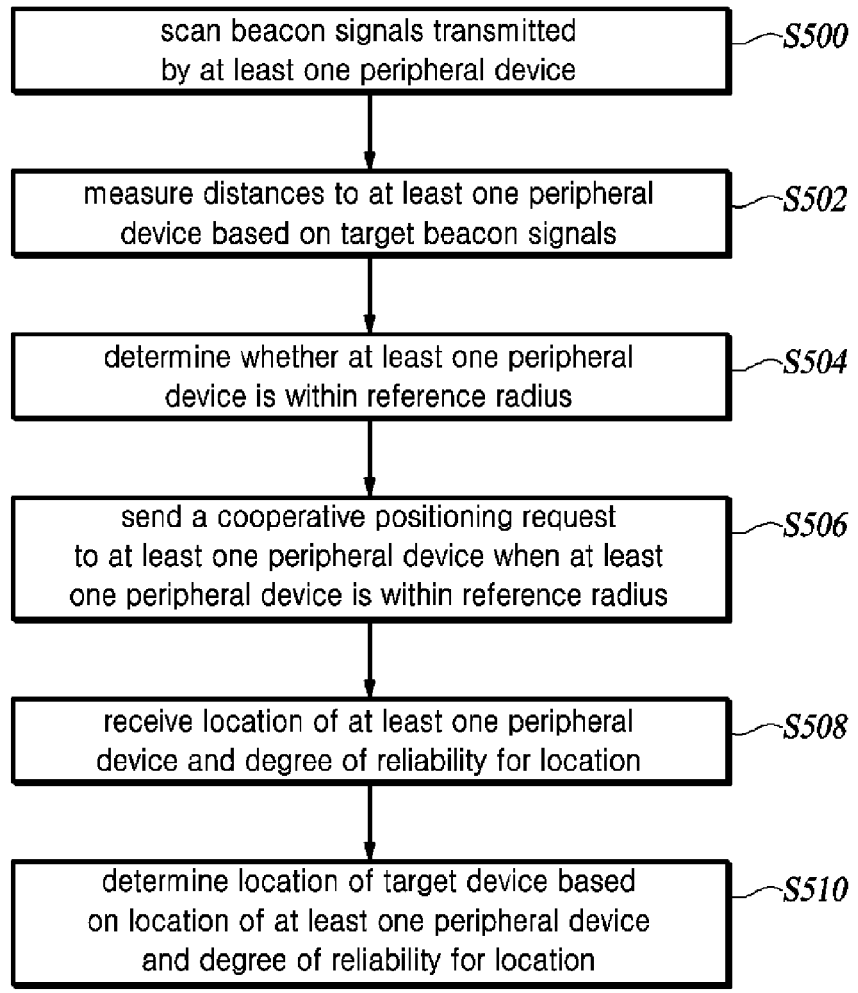
FIG. 5 is a flowchart illustrating a method for cooperative positioning of a target device according to one embodiment of the present disclosure.

FIG. 5 is a flowchart illustrating a method for cooperative positioning of a target device according to one embodiment of the present disclosure.

Referring to FIG. 5, the target device scans beacon signals transmitted by at least one peripheral device (S500).

The target device measures distances to the at least one peripheral device based on the beacon signals (S502).

The target device determines whether the at least one peripheral device is within reference radius (S504).

The target device send a cooperative positioning request to the at least one peripheral device when the at least one peripheral device is within the reference radius (S506).

When at least one peripheral device do not exist within the reference radius, the target device identifies device group including at least three peripheral devices outside the reference radius, and determines whether a difference between distances from two different peripheral devices to the target device is smaller than a preset distance. When the difference is less than the preset distance, the target device sends cooperative positioning requests to at least three peripheral devices included in the device group.

The target device receives a location of the at least one peripheral device and a degree of reliability for the location (S508). Here, the degree of reliability is a value determined based on differences between first distances between locations of a plurality of access points (APs) and the location of the at least one peripheral device, and second distances derived by the at least one peripheral device using signals received from the plurality of APs.

The target device determines a location of target device based on the location of the at least one peripheral device and the degree of reliability for the location (S510).

The target device according to one embodiment of the present disclosure may determine the location of the at least one peripheral device as the location of the target device when the degree of reliability for the location of the at least one peripheral device is greater than a preset value.

When there exists a plurality of peripheral devices within the reference radius, the target device according to one embodiment of the present disclosure may determine, a weighted average of locations of the plurality of peripheral devices as the location of the target device using the degree of reliability for the locations of the plurality of peripheral devices as weights.

When there exists a plurality of peripheral devices within the reference radius, the target device according to one embodiment of the present disclosure may identify locations having a degree of reliability higher than a preset value from locations of the plurality of peripheral devices, and determine a weighted average of the identified locations as the location of the target device using degrees of reliability for the identified locations as weights.

When the target device receives the locations and degrees of reliability from at least three peripheral devices outside the reference radius, the target device may determine circumcenter coordinates of a triangle generated from the at least three locations as the location of the target device. When there are several triangles, the target device may derive circumcenter coordinates of the plurality of triangles and determine either a mean position or a median position of the circumcenter coordinates as the location of the target device.

As described above, according to one embodiment of the present disclosure, it is possible to increase positioning accuracy by allowing a low-performance device that does not support the high-performance positioning technology to indirectly use the high-performance positioning technology of a high-performance device.

According to another embodiment of the present disclosure, when the target device is located in an area where positioning is unfeasible or difficult, the location of the target device can be estimated by using a positioning technology of a peripheral device.

According to another embodiment of the present disclosure, the error due to the distance between the low-performance device and the high-performance device can be reduced by performing a method of determining the location of the low-performance device from the location of the high-performance devices in two ways depending on the distances between the high-performance devices.

Although it is described in FIG. 5 that the processes S500 to S510 are sequentially executed, this is merely illustrative of the technical idea of one embodiment of the present disclosure. In other words, since a person of ordinary skill in the art to which the embodiment of the present disclosure pertains may make various modifications and changes by changing the order of the processes described in FIG. 5 or performing one or more of the processes S500 to S510 in parallel without departing from the essential characteristics of the embodiment of the present disclosure, FIG. 5 is not limited to a time-series order.

Meanwhile, the processes shown in FIG. 5 can be implemented as computer readable codes on a computer-readable recording medium. The computer-readable recording medium includes all types of recording devices in which data readable by a computer system is stored. That is, the computer-readable recording medium may be a non-transitory medium such as ROM, RAM, CD-ROM, a magnetic tape, a floppy disk, or an optical data storage device, and may further include a temporary medium such as a carrier wave (e.g., transmission over the Internet) and a data transmission medium. In addition, the computer-readable recording medium may be distributed in a network-connected computer system, and computer-readable codes may be stored and executed in a distributed manner.

In addition, the components of the present disclosure may use an integrated circuit structure such as a memory, a processor, a logic circuit, a look-up table, and the like. The integrated circuit structures execute each of the functions described in the present specification through the control of one or more microprocessors or other control devices. Further, the components of the present disclosure may be specifically implemented by a part of a program or codes that include one or more executable instructions for performing a specific logical function and is executed by one or more microprocessors or other control devices. Furthermore, the components of the present disclosure may include or be implemented by a central processing unit (CPU), a microprocessor, etc. that perform each function. In addition, the components of the present disclosure may store instructions executed by one or more processors in one or more memories.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method for cooperative positioning performed by a target device, the method comprising:
    scanning a beacon signal transmitted by at least one peripheral device;
    determining whether at least one peripheral device exist within a reference radius based on the beacon signal;
    when the at least one peripheral device is within the reference radius, transmitting a cooperative positioning request to the at least one peripheral device;
    receiving, in response to transmitting the cooperative positioning request, location of the at least one peripheral device and a degree of reliability for the location of the at least one peripheral device, wherein the location of the at least one peripheral device is an estimated location based on a plurality of access points (APs); and
    determining a location of the target device based on the location and the degree of reliability.

2. The method of claim 1, wherein the determining of the location of the target device includes determining the location of the at least one peripheral device as the location of the target device when the degree of reliability for the location of the at least one peripheral device is greater than a preset value.

3. The method of claim 1, wherein the determining of the location of the target device includes, when a plurality of peripheral devices exist within the reference radius, determining a weighted average of locations of the plurality of peripheral devices as the location of the target device using the degree of reliability for the locations of the plurality of peripheral devices as weights.

4. The method of claim 1, wherein the determining of the location of the target device includes:
identifying, when a plurality of peripheral devices exists within the reference radius, locations having a degree of reliability higher than a preset value from locations of the plurality of peripheral devices; and
determining a weighted average of the identified locations as the location of the target device using degrees of reliability for the identified locations as weights.

5. The method of claim 1, wherein the degree of reliability is a value determined based on differences between first distances between locations of the plurality of APs and the location of the at least one peripheral device, and second distances derived by the at least one peripheral device using signals received from the plurality of APs.

6. The method of claim 5, wherein the degree of reliability is a value determined to be higher as the differences between the first distances and the second distances are smaller.

7. The method of claim 1, further comprising:
identifying a device group including at least three peripheral devices outside the reference radius when the at least one peripheral device is outside the reference radius;
transmitting cooperative positioning requests to the at least three peripheral devices when a difference between distances from two different peripheral devices to the target device is smaller than a preset distance;
receiving, in response to transmitting the cooperative positioning requests, at least three locations of the at least three peripheral devices; and
determining circumcenter coordinates of a triangle generated from the at least three locations as the location of the target device.

8. The method of claim 7, further comprising:
identifying a second device group including at least three second peripheral devices outside the reference radius;
selecting a device group having a shorter distance from the target device among the device group and the second device group, when a difference between distances from two different second peripheral devices to the target device is smaller than the preset distance
receiving, in response to transmitting cooperative positioning requests to peripheral devices in the selected device group, locations of the peripheral devices; and
determining circumcenter coordinates of a triangle generated from the locations of the peripheral devices as the location of the target device.

9. The method of claim 7, wherein the identifying the device group is performed when the degree of reliability for the location of the at least one peripheral device is lower than a preset value.

10. The method of claim 7, wherein the determining the circumcenter coordinates of the triangle as the location of the target device includes:
generating the circumcenter coordinates of a plurality of triangles based on the at least three locations; and
determining any one of a mean position or a median position of the circumcenter coordinates as the location of the target device.

11. A target device using a method for cooperative positioning, the device comprising:
a scanning unit configured to scan a beacon signal transmitted by at least one peripheral device;
a determining unit configured to determine whether at least one peripheral device exist within a reference radius based on the beacon signal;
a requesting unit configured to, when the at least one peripheral device is within the reference radius, transmit a cooperative positioning request to the at least one peripheral device;
a receiving unit configured to receive, in response to transmitting the cooperative positioning request, location of the at least one peripheral device and a degree of reliability for the location of the at least one peripheral device, wherein the location of the at least one peripheral device is an estimated location based on a plurality of access points (APs); and
a deciding unit configured to determine a location of the target device based on the location and the degree of reliability.

12. The target device of claim 11, wherein the deciding unit is configured to determine the location of the at least one peripheral device as the location of the target device when the degree of reliability for the location of the at least one peripheral device is greater than a preset value.

13. The target device of claim 11, wherein when a plurality of peripheral devices exists within the reference radius, the deciding unit determines a weighted average of locations of the plurality of peripheral devices as the location of the target device using the degree of reliability for the locations of the plurality of peripheral devices as weights.

14. The target device of claim 11, wherein when a plurality of peripheral devices exists within the reference radius, the deciding unit identifies locations having a degree of reliability higher than a preset value from locations of the plurality of peripheral devices, and determines a weighted average of the identified locations as the location of the target device using degrees of reliability for the identified locations as weights.

15. The target device of claim 11, wherein the degree of reliability is a value determined based on differences between first distances between locations of the plurality of APs and the location of the at least one peripheral device, and second distances derived by the at least one peripheral device using signals received from the plurality of APs.

16. The target device of claim 15, wherein the degree of reliability is a value determined to be higher as the differences between the first distances and the second distances are smaller.

17. The target device of claim 11, wherein the determining unit identifies a device group including at least three peripheral devices outside the reference radius when the at least one peripheral device is outside the reference radius,
wherein the requesting unit transmits cooperative positioning requests to the at least three peripheral devices when a difference between distances from two different peripheral devices to the target device is smaller than a preset distance,
wherein the receiving unit receives at least three locations of the at least three peripheral devices, and wherein the deciding unit determines circumcenter coordinates of a triangle generated from the at least three locations as the location of the target device.

18. The target device of claim 17, further comprising a selecting unit,
wherein the determining unit identifies a second device group including at least three second peripheral devices outside the reference radius,
wherein the selecting unit selects a device group having a shorter distance from the target device among the device group and the second device group when a difference between distances from two different second peripheral devices to the target device is smaller than the preset distance,
wherein the requesting unit transmits cooperative positioning requests to peripheral devices in the selected device group,
wherein the receiving unit receives locations of the peripheral devices, and
wherein the deciding unit determines circumcenter coordinates of a triangle generated from the locations of the peripheral devices as the location of the target device.

19. The target device of claim 17, wherein the determining unit identifies the device group when the degree of reliability for the location of the at least one peripheral device are lower than a preset value.

20. The target device of claim 17, wherein the deciding unit generates the circumcenter coordinates of a plurality of triangles based on the at least three locations, and determines any one of a mean position or a median position of the circumcenter coordinates as the location of the target device.

* * * * *